United States Patent [19]
Schmidt et al.

[11] Patent Number: 5,470,554
[45] Date of Patent: Nov. 28, 1995

[54] BENEFICATION OF SALINE MINERALS

[75] Inventors: Roland Schmidt, Lakewood; Dale L. Denham, Jr., Louisville, both of Colo.

[73] Assignee: Environmental Projects, Inc., Casper, Wyo.

[21] Appl. No.: 66,871

[22] Filed: May 25, 1993

[51] Int. Cl.$^6$ ............................. C22B 26/00; B03C 1/30; B03C 7/00
[52] U.S. Cl. ........................ 423/206.2; 209/40; 209/131
[58] Field of Search ................. 209/40, 131; 423/206.2, 423/121

[56] References Cited

U.S. PATENT DOCUMENTS

| | | | |
|---|---|---|---|
| 2,981,600 | 4/1961 | Porter | 423/121 |
| 3,244,476 | 4/1966 | Smith | 23/63 |
| 3,819,805 | 6/1974 | Graves et al. | 423/206 |
| 3,869,538 | 3/1975 | Sproul et al. | 423/206 |
| 4,202,667 | 5/1980 | Conroy et al. | 423/206.2 |
| 4,238,277 | 8/1981 | Brison et al. | 209/166 |
| 4,341,744 | 7/1982 | Brison et al. | 423/206 T |
| 4,363,722 | 12/1982 | Dresty, Jr. et al. | 209/40 |
| 4,375,454 | 3/1983 | Imperto et al. | 423/206 T |
| 4,512,879 | 4/1985 | Attia et al. | 209/40 |
| 4,943,368 | 7/1990 | Gilbert et al. | 209/40 |
| 5,096,678 | 3/1992 | Mackie | 423/27 |

OTHER PUBLICATIONS

Perry & Chilton, Chemical Engineers' Handbook, 5th ed. 1973, pp. 8–31, no month.
Perry, Chilton and Kirkpatrick, Chemical Engineers Handbook, 4th Ed. (1963), pp. 21–61 to 21–70.

*Primary Examiner*—Steven Bos
*Attorney, Agent, or Firm*—Sheridan Ross & McIntosh

[57] ABSTRACT

A process is provided for recovering a saline mineral from an ore containing the saline mineral and impurities. The process generally comprises the steps of separating a first portion of impurities from the ore by density separation, electrostatically separating a second portion of impurities from the ore, and magnetically separating a third portion of impurities from the ore. The process can further include the steps of crushing the ore and dividing the crushed ore into a plurality of size fractions before the above-referenced separating steps. Furthermore, in order to increase the efficiency of the separating processes, the process of the present invention may further include the steps of drying the ore to remove surface moisture therefrom and de-dusting the ore to recover valuable fines.

22 Claims, No Drawings

BENEFICATION OF SALINE MINERALS

FIELD OF THE INVENTION

The present invention relates generally to the beneficiation of saline minerals and, more specifically, trona. The invention further relates to a dry process for recovering saline minerals from an ore containing saline minerals and impurities.

BACKGROUND OF THE INVENTION

Many saline minerals are recognized as being commercially valuable. For example, trona, borates, potash and sodium chloride are mined commercially. After mining, these minerals need to be beneficiated to remove naturally occurring impurities.

With regard to trona ($Na_2CO_3 \cdot NaHCO_3 \cdot 2H_2O$), high-purity trona is commonly used to make soda ash, which is used in the production of glass and paper. Naturally-occurring trona, or crude trona, is found in large deposits in the western United States, such as in Wyoming and California, and also in Egypt, Kenya, Botswana, Tibet, Venezuela and Turkey. Crude trona ore from Wyoming is typically between about 80% and about 90% trona, with the remaining components including shortite, quartz, dolomite, mudstone, oil shale, kerogen, mica, nahcolite and clay minerals.

The glass and paper making industries generally require soda ash produced from trona having a purity of 99% or more. In order to obtain such a high purity, wet beneficiation processes have been used. Such processes generally involve crushing the crude trona, solubilizing the trona, treating the solution to remove insolubles and organic matter, crystallizing the trona, and drying the trona which may subsequently be calcined to produce soda ash. Alternatively, the crude trona can be calcined to yield crude sodium carbonate, which is then solubilized, treated to remove impurities, crystallized and dried to produce sodium carbonate monohydrate.

Not all industries which use trona require such a highly purified form of trona. For example, certain grades of glass can be produced utilizing trona having less than 97% purity. For this purpose, U.S. Pat. No. 4,341,744 discloses a dry beneficiation process which is less complex and less expensive than the above-described wet beneficiation process. Such a dry beneficiation process generally includes crushing the crude trona, classifying the trona by particle size, electrostatically separating certain impurities, and optionally magnetically separating other impurities. Such a process can yield trona having up to about 95% to 97% purity, depending on the quantity and type of impurities present in the crude trona ore.

There are uses for trona, for example, in certain applications in the glass industry, requiring a purity of at least 97%, yet not needing a purity over 99%. The known dry beneficiation processes typically do not consistently produce such a purity. Consequently, these industries generally use trona purified by the more expensive and complex wet beneficiation processes.

Accordingly, it is an object of the present invention to provide a dry process for the beneficiation of saline minerals and in particular, trona, resulting in higher purities than existing dry beneficiation processes and which is simpler and less expensive than known wet beneficiation processes.

SUMMARY OF THE INVENTION

The present invention is embodied in a process for recovering a high-purity saline mineral from an ore containing the saline mineral and impurities. The process generally includes separating a first portion of impurities from the ore by a density separation method, electrostatically separating a second portion of impurities from the ore, magnetically separating a third portion of impurities from the ore.

In one embodiment, the density separation step can include air tabling or dry jigging to separate impurities having a different density than the saline mineral. In another embodiment, the process of the present invention is used for beneficiating trona from an ore containing trona and impurities. In this embodiment, the first portion of impurities removed by the density separation step comprises shortite.

In another embodiment of the present invention, a process is provided for the production of purified soda ash for production of caustic soda by the lime-soda process. The process generally includes the steps of separating a first portion of impurities from a trona-containing ore by a density separation method, electrostatically separating a second portion of impurities from the ore, magnetically separating a third portion of impurities from the ore. The product of the above-mentioned separation processes is used to produce caustic soda. The process further includes solubilizing aluminum hydroxide in bauxite by contacting the bauxite with the caustic soda to produce a solution and recovering alumina from the solution.

DETAILED DESCRIPTION OF THE INVENTION

The present process is a dry beneficiation process for recovering saline minerals from an ore containing the saline mineral and impurities. The process includes separating a first portion of impurities from the ore by density separation. The process can further include electrostatically separating a second portion of impurities from the ore, and/or magnetically separating a third portion of impurities from the ore. The present process can alternatively include crushing the ore to achieve liberation of impurities and/or sizing the crushed ore into fractions before the separating steps. The present invention provides a process that beneficiates saline minerals to a higher purity than prior known dry beneficiation processes.

The process of the present invention is designed to recover saline minerals from naturally occurring ores to produce commercially valuable purified minerals. As used in the mineral processing industry, the term "saline mineral" refers generally to any mineral which occurs in evaporite deposits. Saline minerals that can be beneficiated by the present process include, without limitation, trona, borates, potash, sulfates, nitrates, sodium chloride, and preferably, trona.

The purity of saline minerals within an ore depends on the deposit location, as well as on the area mined at a particular deposit. In addition, the mining technique used can significantly affect the purity of the saline minerals. For example, by selective mining, higher purities of saline minerals can be achieved. Deposits of trona ore are located at several locations throughout the world, including Wyoming (Green River Formation), California (Searles Lake), Egypt, Kenya, Venezuela, Botswana, Tibet and Turkey (Beypazari Basin). For example, a sample of trona ore from Searles Lake has been found to have between about 50% and about 90% by weight (wt. %) trona and a sample taken from the Green River Formation in Wyoming has been found to have between about 80 and about 90 wt. % trona. The remaining 10 to 20 wt. % of the ore in the Green River Formation sample comprised impurities including shortite (1–5 wt. %) and the bulk of the remainder comprises shale consisting predominantly of dolomite, clay, quartz and kerogen, and traces of other impurities. Other samples of trona ore can include different percentages of trona and impurities, as well as include other impurities.

The present process includes removing a first portion of impurities from an ore containing saline minerals by a density separation method. Density separation methods are based on subjecting an ore to conditions such that materials of different densities physically separate from each other. Thereby, certain impurities having a different density than the desired saline mineral can be separated. The density separation step of the present invention is most preferably a dry process, however, wet density separation processes, such as heavy media separation, can be used as well. In dry density separation processes, the need for processing in a saturated brine solution, solid/brine separation, and drying of the product is eliminated. Consequently, the process according to the present invention is much cheaper and less complex. Any known density separation technique could be used for this step of the present invention, including air tabling or dry jigging.

As discussed above, density separation is conducted by subjecting an ore to conditions such that materials of different densities separate from each other. The mineral stream having materials of varying densities is then separated by a first or rougher pass into a denser and a lighter stream, or into more than two streams of varying densities. Typically, in the case of beneficiating trona, trona is recovered in the lighter stream. The purity of a saline mineral recovered from density separation can be increased by reducing the weight recovery of the recovered stream from the feed stream. At lower weight recoveries, the recovered stream will have a higher purity, but the rougher stage process will also have a reduced yield because more of the desired saline mineral will report to the impurity stream. Such a "high purity" process may be beneficial in that it requires less subsequent processing (e.g., separation) of the ore and, in addition, may be of higher value because it can be used in other applications where high purity saline minerals are required.

In the case of beneficiating trona, for example, the weight recovery (weight of trona recovered/weight of trona in the feed stream) from the density separation step is between about 65% and about 95%. More preferably, the weight recovery is between about 70% and about 90% and, most preferably, the weight recovery is about 80%.

In an alternative embodiment, the impurity stream from density separation can go through one or more scavenger density separation step(s) to recover additional trona to improve the overall recovery. The scavenger separation is similar to the above-described density separation step. The scavenger step recovers a portion of the impurity stream from the rougher pass having the saline mineral in it and combines that portion with the above-described recovered stream to increase the overall yield from density separation or recycles it to other steps in the process, with or without further size reduction.

In a further alternative embodiment, the recovered stream from the rougher pass density separation can go through one or more cleaning density separation steps to further remove impurities from the recovered stream and improve the purity of the final product. The cleaning step is similar to the above-described density separation process in that impurities are removed from the stream by density separation. In both scavenging and cleaning passes, the feed stream into those passes can undergo further size reduction, if desired, for example, to achieve higher liberation.

With regard to the beneficiation of trona, which has a density of 2.14, impurities that are removed during the density separation step of the present invention include shortite, having a density of 2.6, dolomite, having a density of 2.8–2.9 and pyrite, having a density of 5.0. Each of these is separable from the trona ore because of differences in density from trona. By practice of the present invention, of the total amount of shortite, dolomite, pyrite and, if present, potentially valuable heavy minerals in the trona ore, the density separation step can remove at least about 10 wt. % and more preferably, about 50 wt. %, and most preferably, about 90 wt. % of the heavy impurity.

In an alternative embodiment, impurities removed during the density separation process can be recovered as a product for commercial use. For example, in the beneficiation of trona, the impurities removed during the air tabling step can comprise as much as 90% shortite. Such shortite may be acceptable, for example, for certain applications in the glass industry. The acceptability of the shortite in the glass industry will depend upon the consistency and the relative lack of iron in the product. In addition, for some trona deposits, potentially valuable heavy minerals may be present. Such minerals can be separated in the method and recovered.

The present invention further includes removing a second portion of impurities by an electrostatic separation method. Electrostatic separation methods are based on subjecting the ore to conditions such that materials of different electrical conductivities separate from each other. The electrostatic separation of the present invention can be accomplished by any conventional electrostatic separation technique. U.S. Pat. No. 4,341,744 discloses standard electrostatic separation processes suitable for use in the present invention in col. 4, line 62 through col. 6, line 32, which is incorporated herein by reference in its entirety. As discussed in the above-identified patent, saline mineral ore particles are first differentially electrified and then separated into a recovered stream from an impurity stream by various electrostatic separation processes.

As noted above for the density separation step, the impurity stream from the rougher pass of an electrostatic separation process can go through a scavenger step to improve the overall recovery. The scavenger step recovers a saline mineral-containing portion of the impurity stream from the rougher pass through electrostatic separation and combines it with the above-described recovered stream to increase the overall yield of the electrostatic separation step or otherwise cycles it to other steps in the process. Furthermore, the recovered stream from the rougher pass of the electrostatic separation can go through one or more electrostatic cleaning steps to further remove impurities from the recovered stream and improve the purity of the final product.

For example, electrostatic separation can be used to separate trona from impurities having a higher electrical conductivity, such as shale, mudstone or pyrite. It should be appreciated, however, that electrostatic separation could also be used to separate impurities that have a lower electrical conductivity than the saline mineral being recovered. By practice of the present invention, utilizing electrostatic separation can remove at least about 10 wt. %, more preferably, about 50 wt. %, and most preferably, about 90 wt. % of the more conductive mineral impurities from the material being treated by electrostatic separation.

The present process further includes a magnetic separation step which subjects the ore to conditions such that materials of different magnetic susceptibilities separate from each other into a recovered stream and an impurity stream. The magnetic separation step can be accomplished by any conventional technique, such as induced roll, cross-belt, or high intensity rare earth magnetic separation methods. Preferably, induced roll is used in the present invention for the finer fractions and high intensity rare earth magnets are used for the coarser fractions. With regard to the beneficiation of trona, typical impurities that can be removed during the magnetic separation step include shale which has a higher magnetic susceptibility than trona. By practice of the present invention, the use of an induced roll magnetic separation technique can remove at least about 5 wt. %, more preferably, about 50 wt. %, and most preferably about 90 wt. % of the shale from the material being treated by magnetic separation.

As noted above for the density and electrostatic separation steps, the impurity stream from the rougher pass of the magnetic separation process can go through one or more scavenger steps to improve the overall recovery. The scavenger step recovers a portion of the impurity stream from the rougher pass through magnetic separation and combines it with the above-described recovered stream or recycles it to the process with or without further size reduction to increase the overall yield of the magnetic separation step. Furthermore, the recovered stream from magnetic separation can go through one or more magnetic cleaning steps to further remove impurities from the recovered stream and improve the purity of the final product.

It should be appreciated that the above-identified process steps could be performed in any order. Preferably, however, the density separation is performed first, followed by electrostatic separation and finally magnetic separation.

In a further embodiment of the present invention, the saline mineral-containing ore can be crushed to achieve liberation of impurities prior to the separation steps. The crushing step of the present invention can be accomplished by any conventional technique, including impact crushing (e.g., cage or hammer mills), jaw crushing, roll crushing, cone crushing, autogenous crushing or semiautogenous crushing. Autogenous and semi-autogenous crushing are particularly beneficial because the coarse particles of ore partially act as the crushing medium, thus requiring less cost in obtaining grinding media. Moreover, because saline minerals are typically soft, these methods are suitable for use in the present process. In addition, these two crushing methods allow for the continuous removal of crushed material and high grade potentially saleable dust.

In general, crushing to smaller particle size achieves better liberation of impurities and thus, improved recovery. However, if the particle size after crushing is too fine, there may be adverse effects upon subsequent separation steps. In addition, over-crushing is not needed for many applications of the present invention and merely increases the costs associated with the crushing step. It has been found that acceptable liberation for the present process can be achieved by crushing the ore to at least about 6 mesh. Preferably, the particle size range after crushing is from about 6 to about 100 mesh and, more preferably, from about 6 to about 65 mesh.

In another embodiment of the present invention, the ore is sized into size fractions prior to the separation steps. Each size fraction is subsequently processed separately. In general, the narrower the range of particle size within a fraction, the higher the efficiency of removal of impurities. On the other hand, a larger number of fractions will increase the efficiency, but may increase the cost of the overall process. The use of between 3 and 10 fractions has been found to be acceptable. Preferably, the number of fractions is between 4 and 10 and, more preferably, the number of fractions is 8. Any conventional sizing technique can be used for the present process, including screening or air classification. For dividing into 8 fractions, the fractions typically have the following particle size ranges: 6 to 8 mesh; 8 to 10 mesh; 10 to 14 mesh; 14 to 20 mesh; 20 to 28 mesh; 28 to 35 mesh; 35 to 48 mesh; 48 to 65 mesh (Tyler mesh).

In yet another embodiment of the present invention, the ore is dried prior to the separation processes set forth above. The drying step removes surface moisture from the ore to better enable the ore to be separated. Drying can be accomplished by any conventional mineral drying technique, including rotary kiln, fluid bed or air drying. The ore can be dried to less than about 2%, and preferably less than about 1% surface moisture content. During the drying process, it is preferred that the saline mineral is not raised to such a temperature for such a period of time that is it calcined. In the case of trona, the drying temperature should remain below about 40 degrees centigrade to avoid calcination.

In still another embodiment of the present invention, a de-dusting step is added to the basic beneficiation process to remove fines before the electrostatic and magnetic separation steps. De-dusting can be particularly important before electrostatic separation because the dust can otherwise interfere with effective electrostatic separation. Such a de-dusting step can be conducted before, during or after one or more of the crushing, sizing and/or density separation steps. The fines produced during the processing of trona are relatively high purity trona and are useful in several industrial applications. For example, trona recovered by de-dusting can have a purity of greater than about 94%, preferably greater than about 96% and more preferably greater than about 98%. Fines can be collected in de-dusting steps by use of a baghouse, or other conventional filtering device, and sold as purified trona without further processing.

The present invention provides a process for the separation of saline minerals from an ore utilizing a dry beneficiation technique, resulting in a high purity product, typically greater than 85% purity, produced at low cost compared to wet beneficiation processes. Utilizing the above-described process, trona having about 98.8% purity from an ore containing 90% trona has been obtained, compared to less than about 97% purity for the prior art dry beneficiation processes. The purity of recovered product can be greater than about 97%, preferably greater than about 97.5%, and more preferably greater than about 98%. In addition, by utilizing selective mining techniques and lower weight recoveries for the separation steps, higher purities can be obtained.

Utilizing the process of the present invention, recoveries of greater than about 55% can be obtained. More preferably, recoveries are greater than about 65% and, most preferably, greater than about 75%. In the case of trona, the resulting trona product can be used in many applications, especially those requiring a purity of about 97.5% or greater, such as in certain areas of the glass industry.

It has been found that the above-identified process for beneficiating trona is also particularly adaptable for use in the production of caustic for use in alumina production. By transporting beneficiated and calcined trona ore to alumina processing facilities and producing caustic from the beneficiated trona, the total cost for caustic can be significantly below that of caustic currently used in the alumina industry.

For this application, the trona-containing ore is beneficiated and the resulting beneficiated trona is calcined to produce soda ash ($Na_2CO_3$). The soda ash is then converted to caustic soda by conventional processes at an alumina plant and can then be used in conventional alumina processing. For example, the Bayer process can be used in which caustic soda is mixed with bauxite to solubilize the aluminum hydroxide in the bauxite to produce a sodium aluminate solution. Alumina hydrate can be precipitated from the solution and calcined to remove water therefrom.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

EXAMPLES 1–8

Eight samples of trona-containing ore from Bed 17 of the Green River Formation in Wyoming were beneficiated in accordance with the present invention. Each of the samples was crushed to −10 mesh on a roll crusher. The samples were allowed to air dry until they attained a constant weight (about 24 hours). The samples were subsequently screened at 20 mesh, 35 mesh, 65 mesh and 150 mesh Tyler. Each of the four 150 plus size fractions was then subjected to electrostatic separation to generate a conductive and non-conductive stream. The non-conductive stream resulting from the electrostatic separation regime for each of the size fractions was subjected to high intensity magnetic separation to generate a magnetic and non-magnetic stream. The resulting non-conductive/non-magnetic streams from each of the size fractions were then subjected to a density separation step. A heavy liquid separation was used for density separation in these examples. The heavy liquid used was a mixture of acetylene tetrabromide and kerosene. Since the saline mineral being beneficiated was trona, having a specific gravity of 2.14; the major impurity was shortite, having a specific gravity of 2.6; and other impurities having a specific gravity lighter than 2.0 were present, density separations were made at specific gravities of 2.0 and 2.3 to generate a 2.0×2.3 fraction which is the trona fraction.

The data generated from the foregoing beneficiation processes is shown in Tables 1–8. As can be seen from the Tables, the purity of trona recovered ranged from 95.3 in Example 2 to 98.8 in Example 3 (shown as soluble % in 2.0×2.3 S.G. separation). In addition, the effectiveness of the density separation in improving trona purity can be seen by comparing the Soluble % in the "Plus 65 mesh trona" line (before density separation) with the Soluble % in the "2.0× 2.3 S.G." line (after density separation).

TABLE 1

Electrostatic and Magnetic Separation of Trona-containing Waste Rock; Sample 1

| Fraction | Weight Percent | | | Assay | | | |
| --- | --- | --- | --- | --- | --- | --- | --- |
| | Fraction | Sample | Beneficiated Product | Insoluble % | Distr. | Soluble % | Distr. |
| 10 × 20 mesh | | | | | | | |
| conductive stream | 86.4 | 41.7 | | 93.8 | 44.6 | 6.2 | 21.2 |
| magnetic stream | 2.0 | 1.0 | | 67.3 | 0.7 | 32.7 | 2.6 |
| non-conductive/ | 11.6 | 5.6 | 24.6 | 69.5 | 4.4 | 30.5 | 14.0 |
| non-magnetic stream | | | | | | | |
| Total | 100.0 | 48.3 | | 90.5 | 49.8 | 9.5 | 37.7 |
| 20 × 35 mesh | | | | | | | |
| conductive stream | 56.9 | 12.1 | | 91.9 | 12.6 | 8.1 | 8.0 |
| magnetic stream | 9.5 | 2.0 | | 83.6 | 1.9 | 16.4 | 2.7 |
| non-conductive/ | 33.6 | 7.1 | 31.3 | 83.2 | 6.8 | 16.8 | 9.8 |
| non-magnetic stream | | | | | | | |
| Total | 100.0 | 21.2 | | 88.2 | 21.3 | 11.8 | 20.5 |
| 35 × 65 mesh | | | | | | | |
| conductive stream | 28.6 | 3.9 | | 91.5 | 4.1 | 8.5 | 2.7 |
| magnetic stream | 19.1 | 2.6 | | 87.0 | 2.6 | 13.0 | 2.8 |
| non-conductive/ | 52.2 | 7.1 | 31.3 | 85.3 | 6.9 | 14.7 | 8.6 |
| non-magnetic stream | | | | | | | |
| Total | 100.0 | 13.6 | | 87.4 | 13.6 | 12.6 | 14.1 |
| 65 × 150 mesh | | | | | | | |
| conductive stream | 50.8 | 3.7 | | 87.8 | 3.7 | 12.2 | 3.7 |
| magnetic stream | 8.9 | 0.7 | | 82.7 | 0.6 | 17.3 | 0.9 |

TABLE 1-continued

Electrostatic and Magnetic Separation of Trona-containing Waste Rock; Sample 1

| | Weight Percent | | | Assay | | | |
| --- | --- | --- | --- | --- | --- | --- | --- |
| | | | Beneficiated | Insoluble | | Soluble | |
| Fraction | Fraction | Sample | Product | % | Distr. | % | Distr. |
| non-conductive/ | 40.3 | 2.9 | 12.9 | 77.4 | 2.6 | 22.6 | 5.4 |
| non-magnetic stream | | | | | | | |
| Total | 100.0 | 7.3 | | 83.2 | 6.9 | 16.8 | 10.0 |
| Minus 150 mesh | | 9.6 | | 77.4 | 8.4 | 22.6 | 17.7 |
| Plus 65 mesh trona | | 19.9 | | 80.1 | 18.1 | 19.9 | 32.4 |
| Trona Prod., Calc. | | 22.8 | 100.0 | 79.7 | 20.7 | 20.3 | 37.8 |
| Trona + minus 150 Calc. | | 32.4 | | 79.0 | 29.2 | 21.0 | 55.5 |
| Sample Calc. | | 100.0 | | 87.8 | 100.0 | 12.2 | 100.0 |
| Heavy Liquid Density Separation of Plus 65 Mesh Non-Magnetic/ Non-Conductive Sample 1 | | | | | | | |
| <2.0 S.G. | 0.2 | 0.0 | | — | — | — | — |
| 2.0 × 2.3 S.G. | 19.0 | 3.8 | | 3.4 | 0.1 | 96.6 | 29.8 |
| >2.3 S.G. | 80.8 | 16.1 | | 98.3 | 18.0 | 1.7 | 2.5 |
| Total | 100.0 | 19.9 | | 80.1 | 18.1 | 19.9 | 32.4 |

TABLE 2

Electrostatic and Magnetic Separation of Trona-Containing Waste Rock; Sample 2

| | Weight Percent | | | Assay | | | |
| --- | --- | --- | --- | --- | --- | --- | --- |
| | | | Beneficiated | Insoluble | | Soluble | |
| Fraction | Fraction | Sample | Product | % | Distr. | % | Distr. |
| 10 × 20 mesh | | | | | | | |
| conductive stream | 57.6 | 27.6 | | 87.7 | 40.9 | 12.3 | 8.3 |
| magnetic stream | 3.7 | 1.8 | | 68.1 | 2.0 | 31.9 | 1.4 |
| non-conductive/ | 38.7 | 18.6 | 49.4 | 19.1 | 6.0 | 80.9 | 36.9 |
| non-magnetic stream | | | | | | | |
| Total | 100.0 | 47.9 | | 60.4 | 48.9 | 39.6 | 46.6 |
| 20 × 35 mesh | | | | | | | |
| conductive stream | 30.0 | 3.7 | | 81.3 | 5.0 | 18.7 | 1.7 |
| magnetic stream | 15.9 | 2.0 | | 62.9 | 2.1 | 37.1 | 1.9 |
| non-conductive/ | 54.1 | 6.6 | 17.7 | 46.7 | 5.2 | 53.3 | 8.7 |
| non-magnetic stream | | | | | | | |
| Total | 100.0 | 12.3 | | 59.6 | 12.4 | 40.4 | 12.2 |
| 35 × 65 mesh | | | | | | | |
| conductive stream | 45.8 | 9.1 | | 82.8 | 12.8 | 17.2 | 3.9 |
| magnetic stream | 13.5 | 2.7 | | 69.3 | 3.2 | 30.7 | 2.0 |
| non-conductive/ | 40.7 | 8.1 | 21.6 | 47.7 | 6.5 | 52.3 | 10.4 |
| non-magnetic stream | | | | | | | |
| Total | 100.0 | 20.0 | | 66.7 | 22.5 | 33.3 | 16.3 |
| 65 × 150 mesh | | | | | | | |
| conductive stream | 22.0 | 1.6 | | 82.9 | 2.2 | 17.1 | 0.7 |
| magnetic stream | 20.1 | 1.5 | | 74.3 | 1.8 | 25.7 | 0.9 |
| non-conductive/ | 57.9 | 4.2 | 11.2 | 42.0 | 3.0 | 58.0 | 6.0 |
| non-magnetic stream | | | | | | | |
| Total | 100.0 | 7.3 | | 57.5 | 7.1 | 42.5 | 7.6 |
| Minus 150 mesh | | 12.5 | | 43.6 | 9.2 | 56.4 | 17.3 |
| Plus 65 mesh trona | | 33.4 | | 31.6 | 17.8 | 68.4 | 56.0 |
| Trona Prod., Calc. | | 37.6 | 100.0 | 32.7 | 20.8 | 67.3 | 62.0 |

TABLE 2-continued

Electrostatic and Magnetic Separation of Trona-Containing Waste Rock; Sample 2

| Fraction | Weight Percent | | | Assay | | | |
| --- | --- | --- | --- | --- | --- | --- | --- |
| | | | Beneficiated | Insoluble | | Soluble | |
| | Fraction | Sample | Product | % | Distr. | % | Distr. |
| Trona + minus 150 Calc. | | 50.1 | | 35.5 | 30.0 | 64.5 | 79.3 |
| Sample Calc. | | 100.0 | | 59.2 | 100.0 | 40.8 | 100.0 |
| Heavy Liquid Density Separation of Plus 65 Mesh Non-Magnetic/Non-Conductive Sample 2 | | | | | | | |
| <2.0 S.G. | 6.0 | 2.0 | | — | — | — | — |
| 2.0 × 2.3 S.G. | 63.0 | 21.0 | | 4.7 | 1.7 | 95.3 | 49.1 |
| >2.3 S.G. | 31.0 | 10.3 | | 92.3 | 16.1 | 7.7 | 6.9 |
| Total | 100.0 | 33.4 | | 31.6 | 17.8 | 68.4 | 56.0 |

TABLE 3

Electrostatic and Magnetic Separation of Trona-Containing Waste Rock; Sample 3

| Fraction | Weight Percent | | | Assay | | | |
| --- | --- | --- | --- | --- | --- | --- | --- |
| | | | Beneficiated | Insoluble | | Soluble | |
| | Fraction | Sample | Product | % | Distr. | % | Distr. |
| 10 × 20 mesh | | | | | | | |
| conductive stream | 26.1 | 13.2 | | 30.1 | 50.8 | 69.9 | 10.0 |
| magnetic stream | 4.4 | 2.2 | | 4.6 | 1.3 | 95.4 | 2.3 |
| non-conductive/ non-magnetic stream | 69.5 | 35.2 | 58.8 | 2.4 | 10.8 | 97.6 | 37.3 |
| Total | 100.0 | 50.6 | | 9.7 | 63.0 | 90.3 | 49.6 |
| 20 × 35 mesh | | | | | | | |
| conductive stream | 24.9 | 4.0 | | 25.0 | 12.7 | 75.0 | 3.2 |
| magnetic stream | 5.8 | 0.9 | | 5.6 | 0.7 | 94.4 | 1.0 |
| non-conductive/ non-magnetic stream | 69.3 | 11.1 | 18.5 | 3.0 | 4.3 | 97.0 | 11.7 |
| Total | 100.0 | 16.0 | | 8.6 | 17.7 | 91.4 | 15.9 |
| 35 × 65 mesh | | | | | | | |
| conductive stream | 12.3 | 1.3 | | 21.3 | 3.7 | 78.7 | 1.1 |
| magnetic stream | 4.0 | 0.4 | | 6.6 | 0.4 | 93.4 | 0.4 |
| non-conductive/ non-magnetic stream | 83.7 | 9.1 | 15.2 | 4.1 | 4.8 | 95.9 | 9.5 |
| Total | 100.0 | 10.9 | | 6.3 | 8.8 | 93.7 | 11.1 |
| 65 × 150 mesh | | | | | | | |
| conductive stream | 27.5 | 1.8 | | 8.2 | 1.9 | 91.8 | 1.8 |
| magnetic stream | 3.9 | 0.3 | | 4.4 | 0.1 | 95.6 | 0.3 |
| non-conductive/ non-magnetic stream | 68.7 | 4.4 | 7.4 | 3.6 | 2.0 | 96.4 | 4.6 |
| Total | 100.0 | 6.5 | | 4.9 | 4.0 | 95.1 | 6.7 |
| Minus 150 mesh | | 16.0 | | 3.2 | 6.6 | 96.8 | 16.8 |
| Plus 65 mesh trona | | 55.4 | | 2.8 | 19.8 | 97.2 | 58.4 |
| Trona Prod., Calc. | | 59.8 | 100.0 | 2.9 | 21.9 | 97.1 | 63.1 |
| Trona + minus 150 Calc. | | 75.9 | | 2.9 | 28.4 | 97.1 | 79.9 |
| Sample Calc. | | 100.0 | | 7.8 | 100 | 92.2 | 100 |
| Heavy Liquid Density Separation of Plus 65 Mesh Non-Magnetic/Non-Conductive Sample 3 | | | | | | | |
| <2.0 S.G. | 0.2 | 0.1 | | — | — | — | — |
| 2.0 × 2.3 S.G. | 96.1 | 53.2 | | 1.2 | 8.2 | 98.8 | 57.1 |

TABLE 3-continued

Electrostatic and Magnetic Separation of Trona-Containing Waste Rock; Sample 3

| Fraction | Weight Percent | | Beneficiated Product | Assay | | | |
|---|---|---|---|---|---|---|---|
| | Fraction | Sample | | Insoluble % | Distr. | Soluble % | Distr. |
| >2.3 S.G. | 3.7 | 2.1 | | 44.5 | 11.7 | 55.5 | 1.4 |
| Total | 100.0 | 55.4 | | 2.8 | 19.8 | 97.2 | 58.4 |

TABLE 4

Electrostatic and Magnetic Separation of Trona-Containing Waste Rock; Sample 4

| Fraction | Weight Percent | | Beneficiated Product | Assay | | | |
|---|---|---|---|---|---|---|---|
| | Fraction | Sample | | Insoluble % | Distr. | Soluble % | Distr. |
| 10 × 20 mesh | | | | | | | |
| conductive stream | 11.7 | 6.4 | | 11.3 | 22.3 | 88.7 | 5.9 |
| magnetic stream | 6.3 | 3.5 | | 3.0 | 3.2 | 97.0 | 3.5 |
| non-conductive/non-magnetic | 82.0 | 45.0 | 68.3 | 1.9 | 26.3 | 98.1 | 45.6 |
| Total | 100.0 | 54.8 | | 3.1 | 51.8 | 96.9 | 54.9 |
| 20 × 35 mesh | | | | | | | |
| conductive stream | 15.4 | 2.2 | | 14.3 | 9.5 | 85.7 | 1.9 |
| magnetic stream | 10.8 | 1.5 | | 5.4 | 2.5 | 94.6 | 1.5 |
| non-conductive/non-magnetic stream | 73.8 | 10.3 | 15.7 | 2.6 | 8.3 | 97.4 | 10.4 |
| Total | 100.0 | 14.0 | | 4.7 | 20.3 | 95.3 | 13.8 |
| 35 × 65 mesh | | | | | | | |
| conductive stream | 18.7 | 1.4 | | 11.1 | 4.9 | 88.9 | 1.3 |
| magnetic stream | 2.1 | 0.2 | | 10.5 | 0.5 | 89.5 | 0.1 |
| non-conductive/non-magnetic stream | 79.2 | 6.0 | 9.2 | 3.8 | 7.1 | 96.2 | 6.0 |
| Total | 100.0 | 7.6 | | 5.3 | 12.5 | 94.7 | 7.5 |
| 65 × 150 mesh | | | | | | | |
| conductive stream | 17.9 | 1.1 | | 7.0 | 2.3 | 93.0 | 1.0 |
| magnetic stream | 4.4 | 0.3 | | 2.5 | 0.2 | 97.5 | 0.3 |
| non-conductive/non-magnetic stream | 77.7 | 4.6 | 6.9 | 3.0 | 4.2 | 97.0 | 4.6 |
| Total | 100.0 | 5.9 | | 3.7 | 6.7 | 96.3 | 5.8 |
| Minus 150 mesh | | 17.7 | | 1.6 | 8.7 | 98.4 | 18.0 |
| Plus 65 mesh trona | | 61.3 | | 2.2 | 41.7 | 97.7 | 66.6 |
| Trona Prod., Calc. | | 65.9 | 100.0 | 2.3 | 45.9 | 97.8 | 78.7 |
| Trona + minus 150 Calc. | | 83.6 | | 2.1 | 54.6 | 97.9 | 84.6 |
| Sample Calc. | | 100.0 | | 3.2 | 100.0 | 96.8 | 100.0 |
| Heavy Liquid Density Separation of Plus 65 Mesh Non-Magnetic/Non-Conductive Sample 4 | | | | | | | |
| <2.0 S.G. | 0.4 | 0.0 | | — | — | — | — |
| 2.0 × 2.3 S.G. | 98.6 | 60.5 | | 2.0 | 37.3 | 98.0 | 61.2 |
| >2.3 S.G. | 1.0 | 0.6 | | 23.3 | 4.4 | 76.7 | 5.3 |
| Total | 100.0 | 61.3 | | 2.2 | 41.7 | 97.7 | 66.6 |

TABLE 5

Electrostatic and Magnetic Separation of Trona-Containing Waste Rock; Sample 5

|  | Weight Percent | | | Assay | | | |
|---|---|---|---|---|---|---|---|
|  |  |  | Beneficiated | Insoluble | | Soluble | |
| Fraction | Fraction | Sample | Product | % | Distr. | % | Distr. |
| 10 × 20 mesh | | | | | | | |
| conductive stream | 23.0 | 10.9 |  | 37.8 | 48.0 | 62.2 | 7.4 |
| magnetic stream | 5.2 | 2.5 |  | 3.8 | 1.1 | 96.2 | 2.6 |
| non-conductive/ | 71.9 | 34.2 | 56.2 | 3.0 | 11.9 | 97.0 | 36.3 |
| non-magnetic stream | | | | | | | |
| Total | 100.0 | 47.6 |  | 11.0 | 61.0 | 89.0 | 46.4 |
| 20 × 35 mesh | | | | | | | |
| conductive stream | 21.3 | 3.7 |  | 25.7 | 11.0 | 74.3 | 3.0 |
| magnetic stream | 10.2 | 1.8 |  | 5.2 | 1.1 | 94.8 | 1.8 |
| non-conductive/ | 68.5 | 11.9 | 19.5 | 3.5 | 4.8 | 96.5 | 12.5 |
| non-magnetic stream | | | | | | | |
| Total | 100.0 | 17.3 |  | 8.4 | 16.9 | 91.6 | 17.4 |
| 35 × 65 mesh | | | | | | | |
| conductive stream | 19.8 | 2.2 |  | 17.0 | 4.4 | 83.0 | 2.0 |
| magnetic stream | 5.9 | 0.7 |  | 7.4 | 0.6 | 92.6 | 0.7 |
| non-conductive/ | 74.3 | 8.4 | 13.8 | 4.6 | 4.5 | 95.4 | 8.7 |
| non-magnetic stream | | | | | | | |
| Total | 100.0 | 11.3 |  | 7.2 | 9.5 | 92.8 | 11.4 |
| 65 × 150 mesh | | | | | | | |
| conductive stream | 19.7 | 1.6 |  | 11.0 | 2.1 | 89.0 | 1.6 |
| magnetic stream | 3.4 | 0.3 |  | 3.8 | 0.1 | 96.2 | 0.3 |
| non-conductive/ | 76.8 | 6.4 | 10.5 | 4.4 | 3.3 | 95.6 | 6.7 |
| non-magnetic stream | | | | | | | |
| Total | 100.0 | 8.3 |  | 5.7 | 5.5 | 94.3 | 8.6 |
| Minus 150 mesh |  | 15.5 |  | 4.0 | 7.2 | 96.0 | 16.3 |
| Plus 65 mesh trona |  | 54.5 |  | 3.4 | 21.2 | 96.5 | 64.3 |
| Trona Prod., Calc. |  | 60.8 | 100.0 | 3.5 | 24.5 | 96.6 | 72.0 |
| Trona + minus 150 Calc. |  | 76.3 |  | 3.6 | 31.7 | 96.4 | 80.5 |
| Sample Calc. |  | 100 |  | 8.6 | 100 | 91.4 | 100 |
| Heavy Liquid Density Separation of Plus 65 Mesh Non-Magnetic/Non-Conductive Sample 5 | | | | | | | |
| <2.0 S.G. | 0.3 | 0.2 |  | — | — | — | — |
| 2.0 × 2.3 S.G. | 92.6 | 50.4 |  | 2.5 | 14.6 | 97.5 | 53.8 |
| >2.3 S.G. | 7.1 | 3.9 |  | 20.2 | 9.1 | 79.8 | 10.5 |
| Total | 100.0 | 54.5 |  | 3.4 | 21.2 | 96.5 | 64.3 |

TABLE 6

Electrostatic and Magnetic Separation of Trona-Containing Waste Rock; Sample 6

|  | Weight Percent | | | Assay | | | |
|---|---|---|---|---|---|---|---|
|  |  |  | Beneficiated | Insoluble | | Soluble | |
| Fraction | Fraction | Sample | Product | % | Distr. | % | Distr. |
| 10 × 20 mesh | | | | | | | |
| conductive stream | 28.3 | 14.1 |  | 18.0 | 47.7 | 82.0 | 12.2 |
| magnetic stream | 4.4 | 2.2 |  | 2.8 | 1.1 | 97.2 | 2.2 |

TABLE 6-continued

Electrostatic and Magnetic Separation of Trona-Containing Waste Rock; Sample 6

| | Weight Percent | | | Assay | | | |
|---|---|---|---|---|---|---|---|
| | | | Beneficiated | Insoluble | | Soluble | |
| Fraction | Fraction | Sample | Product | % | Distr. | % | Distr. |
| non-conductive/ | 67.3 | 33.4 | 57.3 | 2.1 | 13.2 | 97.9 | 34.5 |
| non-magnetic stream | | | | | | | |
| Total | 100.0 | 49.7 | | 6.6 | 62.0 | 93.4 | 49.0 |
| 20 × 35 mesh | | | | | | | |
| conductive stream | 17.5 | 2.7 | | 21.4 | 10.8 | 78.6 | 2.2 |
| magnetic stream | 6.7 | 1.0 | | 3.8 | 0.7 | 96.2 | 1.0 |
| non-conductive/ | 75.8 | 11.6 | 19.9 | 3.0 | 6.5 | 97.0 | 11.9 |
| non-magnetic stream | | | | | | | |
| Total | 100.0 | 15.3 | | 6.3 | 18.1 | 93.7 | 15.1 |
| 35 × 65 mesh | | | | | | | |
| conductive stream | 13.0 | 1.1 | | 16.2 | 3.5 | 83.8 | 1.0 |
| magnetic stream | 6.0 | 0.5 | | 6.7 | 0.7 | 93.3 | 0.5 |
| non-conductive/ | 81.0 | 7.1 | 12.3 | 2.8 | 3.8 | 97.2 | 7.3 |
| non-magnetic stream | | | | | | | |
| Total | 100.0 | 8.8 | | 4.8 | 7.9 | 95.2 | 8.9 |
| 65 × 150 mesh | | | | | | | |
| conductive stream | 16.5 | 1.3 | | 6.6 | 1.6 | 93.4 | 1.3 |
| magnetic stream | 4.2 | 0.3 | | 3.6 | 0.2 | 96.4 | 0.3 |
| non-conductive/ | 79.3 | 6.1 | 10.5 | 2.2 | 2.5 | 97.8 | 6.3 |
| non-magnetic stream | | | | | | | |
| Total | 100.0 | 7.7 | | 3.0 | 4.3 | 97.0 | 7.9 |
| Minus 150 mesh | | 18.5 | | 2.2 | 7.7 | 97.8 | 19.1 |
| Plus 65 mesh trona | | 52.1 | | 2.4 | 23.5 | 97.6 | 60.1 |
| Trona Prod., Calc. | | 58.3 | 100.0 | 2.4 | 26.0 | 97.6 | 71.3 |
| Trona + minus 150 Calc. | | 76.8 | | 2.3 | 33.7 | 97.7 | 79.2 |
| Sample Calc. | | 100.0 | | 5.3 | 100.0 | 94.7 | 100.0 |
| Heavy Liquid Density Separation of Plus 65 Mesh Non-Magnetic/Non-Conductive Sample 6 | | | | | | | |
| <2.0 S.G. | 0.4 | 0.2 | | — | — | — | — |
| 2.0 × 2.3 S.G. | 98.8 | 51.5 | | 2.0 | 19.4 | 98.0 | 53.3 |
| >2.3 S. G. | 0.8 | 0.4 | | 52.5 | 4.1 | 47.5 | 6.8 |
| Total | 100.0 | 52.1 | | 2.4 | 23.5 | 97.6 | 60.1 |

TABLE 7

Electrostatic and Magnetic Separation of Trona-Containing Waste Rock; Sample 7

| | Weight Percent | | | Assay | | | |
|---|---|---|---|---|---|---|---|
| | | | Beneficiated | Insoluble | | Soluble | |
| Fraction | Fraction | Sample | Product | % | Distr. | % | Distr. |
| 10 × 20 mesh | | | | | | | |
| conductive stream | 0.0 | 0.0 | | | 0.0 | | 0.0 |
| magnetic stream | 15.8 | 5.0 | | 34.1 | 16.5 | 65.9 | 3.6 |
| non-conductive/ | 84.2 | 26.3 | 34.6 | 9.7 | 24.9 | 90.3 | 26.5 |
| non-magnetic stream | | | | | | | |
| Total | 100.0 | 31.3 | | 13.6 | 41.3 | 86.4 | 30.2 |
| 20 × 35 mesh | | | | | | | |
| conductive stream | 0.0 | 0.0 | | | 0.0 | | 0.0 |

TABLE 7-continued

Electrostatic and Magnetic Separation of Trona-Containing Waste Rock; Sample 7

| Fraction | Weight Percent | | Beneficiated Product | Assay | | | |
|---|---|---|---|---|---|---|---|
| | Fraction | Sample | | Insoluble % | Distr. | Soluble % | Distr. |
| magnetic stream | 8.0 | 1.7 | | 29.3 | 4.8 | 70.7 | 1.3 |
| non-conductive/ | 92.0 | 19.3 | 25.3 | 7.7 | 14.5 | 92.3 | 19.9 |
| non-magnetic stream | | | | | | | |
| Total | 100.0 | 21.0 | | 9.4 | 19.2 | 90.6 | 21.2 |
| 35 × 65 mesh | | | | | | | |
| conductive stream | 0.0 | 0.0 | | | 0.0 | | 0.0 |
| magnetic stream | 11.4 | 2.2 | | 23.7 | 5.1 | 76.3 | 1.9 |
| non-conductive/ | 88.6 | 17.0 | 22.3 | 6.4 | 10.6 | 93.6 | 17.8 |
| non-magnetic stream | | | | | | | |
| Total | 100.0 | 19.2 | | 8.4 | 15.7 | 91.6 | 19.6 |
| 65 × 150 mesh | | | | | | | |
| conductive stream | 0.0 | 0.0 | | | 0.0 | | 0.0 |
| magnetic stream | 6.5 | 0.9 | | 21.1 | 1.9 | 78.9 | 0.8 |
| non-conductive/ | 93.5 | 13.6 | 17.8 | 7.6 | 10.0 | 92.4 | 14.0 |
| non-magnetic stream | | | | | | | |
| Total | 100.0 | 14.5 | | 8.5 | 12.0 | 91.5 | 14.8 |
| Minus 150 mesh | | 14.0 | | 8.7 | 11.8 | 91.3 | 14.2 |
| Plus 65 mesh trona | | 62.7 | | 8.2 | 49.9 | 91.9 | 78.1 |
| Trona Prod., Calc. | | 76.3 | 100.0 | 8.1 | 60.0 | 91.8 | 77.5 |
| Trona + minus 150 Calc. | | 90.2 | | 8.2 | 71.8 | 91.8 | 92.4 |
| Sample Calc. | | 100.0 | | 10.3 | 100.0 | 89.7 | 100.0 |
| Heavy Liquid Density Separation of Plus 65 Mesh Non-Magnetic/Non Conductive Sample 7 | | | | | | | |
| <2.0 S.G. | 0.2 | 0.1 | | — | — | — | — |
| 2.0 × 2.3 S.G. | 93.0 | 58.3 | | 4.2 | 23.8 | 95.8 | 62.2 |
| >2.3 S.G. | 6.8 | 4.3 | | 63.0 | 26.1 | 37.0 | 15.9 |
| Total | 100.0 | 62.7 | | 8.2 | 49.9 | 91.9 | 78.1 |

TABLE 8

Electrostatic and Magnetic Separation of Trona-Containing Waste Rock; Sample 8

| Fraction | Weight Percent | | Beneficiated Product | Assay | | | |
|---|---|---|---|---|---|---|---|
| | Fraction | Sample | | Insoluble % | Distr. | Soluble % | Distr. |
| 10 × 20 mesh | | | | | | | |
| conductive stream | 18.8 | 6.2 | | 35.0 | 23.6 | 65.0 | 4.5 |
| magnetic stream | 1.3 | 0.4 | | 28.7 | 1.4 | 71.3 | 0.4 |
| non-conductive/ | 79.9 | 26.5 | 40.9 | 4.4 | 12.6 | 95.6 | 27.9 |
| non-magnetic stream | | | | | | | |
| Total | 100.0 | 33.2 | | 10.5 | 37.6 | 89.5 | 32.7 |
| 20 × 35 mesh | | | | | | | |
| conductive stream | 13.6 | 3.0 | | 45.7 | 15.0 | 54.3 | 1.8 |
| magnetic stream | 2.1 | 0.5 | | 40.9 | 2.1 | 59.1 | 0.3 |
| non-conductive/ | 84.3 | 18.9 | 29.2 | 6.3 | 12.9 | 93.7 | 19.5 |
| non-magnetic stream | | | | | | | |
| Total | 100.0 | 22.4 | | 12.4 | 30.0 | 87.6 | 21.6 |

TABLE 8-continued

Electrostatic and Magnetic Separation of Trona-Containing Waste Rock; Sample 8

|  | Weight Percent | | Beneficiated Product | Assay | | | |
|---|---|---|---|---|---|---|---|
| | | | | Insoluble | | Soluble | |
| Fraction | Fraction | Sample | | % | Distr. | % | Distr. |
| 35 × 65 mesh | | | | | | | |
| conductive stream | 10.0 | 1.1 | | 50.2 | 5.9 | 49.8 | 0.6 |
| magnetic stream | 3.2 | 0.3 | | 48.9 | 1.8 | 51.1 | 0.2 |
| non-conductive/ | 86.7 | 9.3 | 14.4 | 6.9 | 7.0 | 93.1 | 9.6 |
| non-magnetic stream | | | | | | | |
| Total | 100.0 | 10.8 | | 12.6 | 14.7 | 87.4 | 10.4 |
| 65 × 150 mesh | | | | | | | |
| conductive stream | 12.7 | 1.5 | | 22.1 | 3.6 | 77.9 | 1.3 |
| magnetic stream | 2.5 | 0.3 | | 32.0 | 1.0 | 68.0 | 0.2 |
| non-conductive/ | 84.8 | 10.0 | 15.4 | 3.6 | 3.9 | 96.4 | 10.6 |
| non-magnetic stream | | | | | | | |
| Total | 100.0 | 11.8 | | 6.7 | 8.5 | 93.3 | 12.1 |
| Minus 150 mesh | | 21.9 | | 3.9 | 9.2 | 96.1 | 23.2 |
| Plus 65 mesh trona | | 54.7 | | 5.5 | 32.5 | 94.5 | 57.0 |
| Trona Prod., Calc. | | 64.7 | 100.0 | 5.2 | 36.4 | 94.8 | 67.6 |
| Trona + minus 150 Calc. | | 86.6 | | 4.9 | 45.6 | 95.1 | 90.8 |
| Sample Calc. | | 100.0 | | 9.2 | 100.0 | 90.8 | 100.0 |
| Heavy Liquid Density Separation of Plus 65 Mesh Non-Magnetic/Non-Conductive Sample 8 | | | | | | | |
| <2.0 S.G. | 0.3 | 0.2 | | — | — | — | — |
| 2.0 × 2.3 S.G. | 97.0 | 53.1 | | 2.0 | 11.5 | 98.0 | 57.3 |
| >2.3 S.G. | 2.7 | 1.5 | | | | | |
| Total | 100.0 | 54.7 | | 5.5 | 32.5 | 94.5 | 57.0 |

EXAMPLE 9

An ore sample containing trona, recovered from Bed 17 of the Green River Formation in Wyoming, was beneficiated using the process described below and the results are represented by the data in Table 9. The ore was a commercially available trona-containing material identified as T-50, available from Solvay Minerals S.A., Green River, Wyo. The T-50 material has a trona purity of about 95% and a size range of 20×150 mesh Tyler.

The ore sample was first classified using a screening process to divide the ore sample into three size fractions: +35 mesh, 35×65 mesh, and −65 mesh. After screening, the +35 mesh and 35×65 mesh fractions were each separated on an air table into three density fractions: ultra-heavy, heavy and light.

After air tabling, each of the density fractions which were air tabled, and the −65 mesh size fraction that was not air tabled, were electrostatically separated by a high tension separator. To improve trona recovery, as seen in Table 9, the light and heavy density fractions from the +35 mesh size fraction were combined and electrostatically separated together. Similarly, the light and heavy density fractions from the 35×65 mesh size fraction were electrostatically separated together. Electrostatic separation was further performed on the ultra-heavy fraction from the +35 mesh size fraction, the ultra-heavy fraction from the 35×65 mesh size fraction, and the −65 mesh size fraction that was not air tabled. Each of the above-identified electrostatic separation processes divided the sample into three electrostatic fractions: conductors, middlings, and non-conductors. The respective weights and weight percentages of each electrostatic fraction are listed in the three columns of data in Table 9, as noted above.

The non-conductors and middlings from each of the above-referenced electrostatic separation processes were individually magnetically separated utilizing an induced roll magnetic separator. The conductors from each of the electrostatic separation processes were not subjected to magnetic separation. The magnetic separation process separated each incoming sample into two fractions: magnetic and non-magnetic. The weights and weight percentages of each magnetically separated fraction are listed in the three columns of data in Table 9, as described above.

The cumulative products of the entire recovery process are represented by the data in the third column at the end of Table 9. The data represents the weight percentage of non-magnetic, non-conductor material recovered from the combined light and heavy density fractions and from the ultra-heavy density fraction. As can be seen from the Table, 91.3% of the original sample was recovered as non-magnetic, non-conductive material. The trona purity of the recovered material was determined. The trona product from the lights plus heavies had a purity of 98.2%. The trona product from the ultra-heavies, which contained the shortite, had a purity of 88.9%. Comparison of these purities illustrates the benefit of removing shortite.

TABLE 9

Density, Electrostatic and Magnetic Separation of Trona Ore; Sample 9

| Separation | Weight (g, unless otherwise noted) | Weight Percent Fraction* | Weight Percent Sample** | Purity (% trona) |
|---|---|---|---|---|
| SCREENING | | | | |
| plus 35 mesh | 362 lb | 36.8 | 36.8 | |
| 35 × 65 mesh | 482 lb | 49.0 | 49.0 | |
| minus 65 mesh | 140 lb | 14.2 | 14.2 | |
| Total | 984 lb | 100.0 | 100.0 | |
| AIR TABLE SEPARATIONS | | | | |
| plus 35 mesh | | | | |
| Ult. Heavy | 1605 | 4.2 | 1.5 | |
| Heavy | 1814 | 4.7 | 1.7 | |
| Lights | 34960 | 91.1 | 33.5 | |
| Total | 38379 | 100.00 | 36.8 | |
| 35 × 65 mesh | | | | |
| Ult. Heavy | 800 | 2.4 | 1.2 | |
| Heavy | 1603.5 | 4.7 | 2.3 | |
| Lights | 31560 | 92.9 | 45.5 | |
| Total | 33963.5 | 100.0 | 49.0 | |
| minus 65 mesh | not air tabled | | | |
| HIGH TENSION ELECTROSTATIC SEPARATIONS (HT) | | | | |
| plus 35 mesh air table lights + heavies | | | | |
| Cond. | 190.8 | 7.4 | 2.6 | |
| Midd | 230.5 | 8.9 | 3.1 | |
| Non-Cond. | 2159.5 | 83.7 | 29.5 | |
| Total | 2580.8 | 100.0 | 35.3 | |
| 35 × 65 mesh air table lights + heavies | | | | |
| Cond. | 90.4 | 4.5 | 2.2 | |
| Midd | 199.3 | 10.0 | 4.8 | |
| Non-Cond. | 1709.5 | 85.5 | 40.9 | |
| Total | 1999.2 | 100.0 | 47.8 | |
| plus 35 mesh air table ultra heavies | | | | |
| Cond. | 467.3 | 29.2 | 0.4 | |
| Midd | 188.7 | 11.8 | 0.2 | |
| Non-Cond. | 943 | 59.0 | 0.9 | |
| Total | 1599 | 100.0 | 1.5 | |
| 35 × 65 mesh air table ultra heavies | | | | |
| Cond. | 97 | 12.1 | 0.1 | |
| Midd | 106.8 | 13.4 | 0.2 | |
| Non-Cond. | 595 | 74.5 | 0.9 | |
| Total | 798.8 | 100.0 | 1.2 | |
| minus 65 mesh | | | | |
| Cond. | 23.4 | 1.4 | 0.2 | |
| Midd | 96.9 | 6.0 | 0.9 | |
| Non-Cond. | 1500.6 | 92.6 | 13.2 | |
| Total | 1620.9 | 100.0 | 14.2 | |
| HIGH INTENSITY MAGNETIC SEPARATIONS (HI) | | | | |
| plus 35 mesh Non Cond. from lights + heavies | | | | |
| HI Mag. | 22.6 | 1.0 | 0.31 | |
| HI Non Mag. | 2136.0 | 99.0 | 29.19 | |
| Total | 2158.6 | 100.0 | 29.50 | |
| 35 × 65 mesh Non Cond. from lights + heavies | | | | |
| HI Mag. | 61.1 | 4.1 | 1.67 | |
| HI Non Mag. | 1438.1 | 95.9 | 39.23 | |
| Total | 1499.2 | 100.0 | 40.90 | |
| plus 35 mesh Non Cond. from ultra heavies | | | | |
| HI Mag. | 11.2 | 1.2 | 0.01 | |
| HI Non Mag. | 931.7 | 98.8 | 0.90 | |
| Total | 942.9 | 100.0 | 0.91 | |
| 35 × 65 mesh Non Cond. from ultra heavies | | | | |
| HI Mag. | 53.1 | 8.9 | 0.08 | |
| HI Non Mag. | 541.7 | 91.1 | 0.78 | |
| Total | 594.8 | 100.0 | 0.86 | |
| minus 65 mesh Non Cond. | | | | |
| HI Mag. | 59.9 | 3.5 | 0.46 | |
| HI Non Mag. | 1649.0 | 96.5 | 12.71 | |
| Total | 1708.9 | 100.0 | 13.17 | |
| plus 35 mesh HT Mid from lights + heavies | | | | |
| HI Mag. | 15.6 | 7.8 | 0.25 | |
| HI Non Mag. | 183.8 | 92.2 | 2.90 | |
| Total | 199.4 | 100.0 | 3.15 | |
| 35 × 65 mesh HT Mid from lights + heavies | | | | |
| HI Mag. | 13.8 | 6.0 | 0.29 | |
| HI Non Mag. | 216.9 | 94.0 | 4.48 | |
| Total | 230.7 | 100.0 | 4.77 | |
| minus 65 mesh HT Mid | | | | |
| HI Mag. | 11.8 | 12.2 | 0.02 | |
| HI Non Mag. | 85.1 | 87.8 | 0.16 | |
| Total | 96.9 | 100.0 | 0.18 | |
| plus 35 mesh HT Mid from ultra heavies | | | | |
| HI Mag. | 7.6 | 4.0 | 0.01 | |
| HI Non Mag. | 181.2 | 96.0 | 0.15 | |
| Total | 188.8 | 100.0 | 0.15 | |
| 35 × 65 mesh HT Mid from ultra heavies | | | | |
| HI Mag. | 6.9 | 6.5 | 0.05 | |
| HI Non Mag. | 100.0 | 93.5 | 0.80 | |
| Total | 106.9 | 100.0 | 0.85 | |
| CUMULATIVE PRODUCTS | | | | |
| Recovered from lights + heavies | | | | |
| Primary non mag, non conductor | | | 81.13 | 99.2 |
| Scav. non mag, non conductor | | | 7.54 | 94.4 |
| Subtotal | | | 88.67 | 98.0 |
| Recovered from ultra heavies | | | | |
| Primary non mag, non conductor | | | 1.68 | 85.0 |
| Scav. non mag, non conductor | | | 0.94 | 95.7 |
| Subtotal | | | 2.62 | 88.9 |

TABLE 9-continued

Density, Electrostatic and Magnetic Separation of Trona Ore; Sample 9

| Separation | Weight (g, unless otherwise noted) | Weight Percent Fraction* | Weight Percent Sample** | Purity (% trona) |
|---|---|---|---|---|
| Total non mag, non conductor (incl. −65 mesh) | | | 91.30 | 97.7 |
| Total conductor | | | 5.56 | 55.2 |
| Total HI magnetics | | | 3.14 | 80.3 |
| Head Calc. from all test products | | | 100.00 | 94.8 |

*Based on feed to separation as 100%
**Based on original sample as 100%

EXAMPLE 10

This example illustrates beneficiation of trona using air tabling, electrostatic separation and magnetic separation, and demonstrates a relationship between breadth of size fractions and effectiveness of air tabling as the density separation method by comparison with heavy liquid separation.

A sample of bulk trona from Bed 17 of the Green River Formation in Wyoming was crushed to −6 mesh. The sample was subsequently sized into size fractions of 6×10 mesh, 10×20 mesh, 20×35 mesh, 35×65 mesh (Tyler mesh). Each of the plus 65 mesh size fractions was then subjected to initial density separation on an air table (Rougher Pass). The Rougher Pass light fractions were subsequently sent through a cleaner pass and for the 6×10 mesh fraction, the heavy fraction was sent to a scavenger pass. The resulting separations are shown in Table 10.1.

Each of the size fractions was then subsequently beneficiated using either magnetic separation (in the case of 6×10 mesh fraction) or electrostatic separation and magnetic separation. The portions of material from each separation reporting to various product streams are shown in Table 10.1.

The non-magnetic, in the case of the 6×10 mesh fraction, and the non-magnetic/non-conductive fractions were then further analyzed by conducting a second density separation based on heavy liquid separation to identify what portion of impurities which are separable by density separation had not been removed in the earlier air tabling step. The results of this analysis are shown in Table 10.2. The column entitled ">2.3 S.G., %" identifies the total amount of material separated from the beneficiated ore by the additional heavy liquid density separation step. Additionally, that column shows subcolumns titled "Plus" and "Minus." These two subcolumns represent a breakdown of the "Total" percentage of material which is greater than 2.3 S.G. which falls into either the coarser or finer portion of the particular stream. For example, the 6×10 mesh fraction was broken down into a 6×8 mesh fraction and an 8×10 mesh fraction. Thus, by comparing the "Plus" and "Minus" subcolumns of the ">2.3 S.G., %," it can be seen that inefficiency in the air tabling density separation tended to be at smaller particle sizes within each size fraction because most of the higher specific gravity material left by air tabling was in the smaller particle sizes (the "Minus" subcolumn).

The columns titled "Insoluble Assay" and "Soluble Assay" provide data on the portion of each stream which is insoluble (i.e., impurity) before heavy liquid separation ("Total" subcolumn) and after heavy liquid separation ("<2.3 S.G." subcolumn). Thus, for example, the purity of products resulting from beneficiating ore using air tabling can be seen in the "Total" subcolumn of the "Soluble Assay" column for each of the different streams. This purity can be compared with the subsequent column, having a higher purity, which identifies the purity of the beneficiated material with the subsequent heavy liquid separation to indicate a theoretical purity based on perfect density separation. In addition, the improvement in trona purity between the non-magnetic/non-conductive product which was not air tabled and the non-magnetic/non-conductive product which was air tabled can be seen by comparing the "Total Non-Magnetic/Non-Conductive from Untabled Feed" line with the "Total Non-Magnetic/Non-Conductive from Cleaner Lights" line in the "Cumulative Products" section of Table 10.2.

TABLE 10.1

Data from Air Table Tests on Bulk Trona Sample Crushed to Minus 6 Mesh

| Product | Feed | Weight, % of Size Fraction | Sample |
|---|---|---|---|
| 6 × 10 MESH | | | |
| Rougher Pass | | | |
| Heavies | 17.7 | 17.7 | 7.9 |
| Lights | 82.3 | 82.3 | 36.7 |
| Feed Calc. | 100.0 | 100.0 | 44.6 |
| Scavenger Pass | | | |
| Heavies | 2.8 | 3.1 | 0.2 |
| Lights | 97.2 | 17.2 | 7.7 |
| Feed Calc. | 100.0 | 20.3 | 7.9 |
| Cleaner Pass | | | |
| Heavies | 1.5 | 1.2 | 0.6 |
| Lights | 98.5 | 81.1 | 36.2 |
| Feed Calc. | 100.0 | 82.3 | 36.7 |
| 10 × 20 MESH | | | |
| Rougher Pass | | | |
| Heavies | 7.6 | 7.6 | 0.9 |
| Lights | 92.4 | 92.4 | 11.4 |
| Feed Calc. | 100.0 | 100.0 | 12.3 |
| Cleaner Pass | | | |
| Heavies | 2.5 | 2.3 | 0.3 |
| Lights | 97.5 | 90.1 | 11.1 |
| Feed Calc. | 100.0 | 92.4 | 11.4 |
| 20 × 35 MESH | | | |
| Rougher Pass | | | |
| Heavies | 7.8 | 7.8 | 1.0 |
| Lights | 92.2 | 92.2 | 11.3 |
| Feed Calc. | 100.0 | 100.0 | 12.3 |
| Cleaner Pass | | | |
| Heavies | 6.8 | 6.3 | 0.8 |
| Lights | 93.2 | 85.9 | 10.6 |
| Feed Calc. | 100.0 | 92.2 | 11.3 |
| 35 × 65 MESH | | | |
| Rougher Pass | | | |
| Heavies | 3.8 | 3.8 | 0.2 |
| Lights | 96.2 | 96.2 | 5.4 |
| Feed Calc. | 100.0 | 100.0 | 5.6 |
| Cleaner Pass | | | |
| Heavies | 0.7 | 0.7 | 0.0 |
| Lights | 99.3 | 95.5 | 5.3 |
| Feed Calc. | 100.0 | 96.2 | 5.4 |
| MINUS 65 MESH (not air tabled) | | | 25.2 |
| TOTAL FEED CALC. | | | 100.0 |

TABLE 10.2

Data from Electrostatic and Induced Roll Separation on Air Table Products
Feed Crushed to minus 6 mesh

| Product | Weight Percent Feed | Weight Percent Sample | >2.3 S.G., % Plus | >2.3 S.G., % Minus | >2.3 S.G., % Total | >2.3 S.G., Dist., % Plus | >2.3 S.G., Dist., % Minus | >2.3 S.G., Dist., % Size | Insoluble Assay, % of Total | Insoluble Assay, % of <2.3 SG | Soluble Assay, % of Total | Soluble Assay, % of <2.3 SG |
|---|---|---|---|---|---|---|---|---|---|---|---|---|
| 6 × 10 MESH Not Tabled | | | | | | | | | | | | |
| Mag | 9.0 | 4.0 | | | | | | | | | | |
| Non Mag | 91.0 | 40.6 | 0.47 | 0.74 | 1.21 | 100.0 | 100.0 | 100.0 | 3.8 | 2.3 | 96.2 | 97.7 |
| Feed Calc. | 100.0 | 44.6 | | | | | | | | | | |
| Rougher Lights | | | | | | | | | | | | |
| Mag | 12.2 | 4.5 | | | | | | | | | | |
| Non Mag | 87.8 | 32.2 | 0.17 | 0.86 | 1.03 | 28.7 | 92.3 | 67.6 | 3.2 | 2.3 | 96.8 | 97.7 |
| Feed Calc. | 100.0 | 36.7 | | | | | | | | | | |
| Scavenger Lights | | | | | | | | | | | | |
| Mag | 4.6 | 0.4 | | | | | | | | | | |
| Non Mag | 95.4 | 7.3 | 1.02 | 2.26 | 3.28 | 39.3 | 55.3 | 49.0 | 6.7 | 2.4 | 93.3 | 97.6 |
| Feed Calc. | 100.0 | 7.7 | | | | | | | | | | |
| Cleaner Lights | | | | | | | | | | | | |
| Mag | 11.6 | 4.2 | | | | | | | | | | |
| Non Mag | 88.4 | 32.0 | 0.1 | 0.86 | 0.96 | 16.8 | 91.6 | 62.5 | 3.2 | 2.3 | 96.8 | 97.7 |
| Feed Calc. | 100.0 | 36.2 | | | | | | | | | | |
| 10 × 20 MESH Not Tabled | | | | | | | | | | | | |
| Cond. | 20.6 | 2.5 | | | | | | | | | | |
| Mag | 1.7 | 0.2 | | | | | | | | | | |
| Non Mag/Non Cond. | 77.6 | 9.6 | 0.6 | 1.32 | 1.92 | 100.0 | 100.0 | 100.0 | 5.1 | 3.1 | 94.9 | 96.9 |
| Feed Calc. | 100.0 | 12.3 | | | | | | | | | | |
| Rougher Lights | | | | | | | | | | | | |
| Cond. | 15.0 | 1.7 | | | | | | | | | | |
| Mag | 2.4 | 0.3 | | | | | | | | | | |
| Non Mag/Non Cond. | 82.6 | 9.4 | 0.06 | 0.52 | 0.58 | 9.9 | 38.8 | 29.8 | 3.6 | 3.1 | 96.4 | 96.9 |
| Feed Calc. | 100.0 | 11.4 | | | | | | | | | | |
| Cleaner Lights | | | | | | | | | | | | |
| Cond. | 9.9 | 1.1 | | | | | | | | | | |
| Mag | 2.1 | 0.2 | | | | | | | | | | |
| Non Mag/Non Cond. | 88.0 | 9.8 | 0.01 | 0.55 | 0.56 | 1.7 | 42.6 | 29.8 | 3 | 2.5 | 97 | 97.5 |
| Feed Calc. | 100.0 | 11.1 | | | | | | | | | | |
| 20 × 35 MESH Not Tabled | | | | | | | | | | | | |
| Cond. | 18.2 | 2.2 | | | | | | | | | | |
| Mag | 2.9 | 0.4 | | | | | | | | | | |
| Non Mag/Non Cond. | 78.9 | 9.7 | 0.62 | 2.24 | 2.86 | 100.0 | 100.0 | 100.0 | 5.4 | 3.1 | 94.6 | 96.9 |
| Feed Calc. | 100.0 | 12.3 | | | | | | | | | | |
| Rougher Lights | | | | | | | | | | | | |
| Cond. | 15.8 | 1.8 | | | | | | | | | | |
| Mag | 2.3 | 0.3 | | | | | | | | | | |
| Non Mag/Non Cond. | 81.9 | 9.3 | 0.15 | 1.93 | 2.08 | 23.1 | 82.2 | 69.4 | 4.7 | 3.1 | 95.3 | 96.9 |
| Feed Calc. | 100.0 | 11.3 | | | | | | | | | | |
| Cleaner Lights | | | | | | | | | | | | |
| Cond. | 14.2 | 1.5 | | | | | | | | | | |
| Mag | 2.8 | 0.3 | | | | | | | | | | |
| Non Mag/Non Cond. | 83.0 | 8.8 | 0.1 | 0.71 | 0.81 | 14.6 | 28.8 | 25.7 | 4.4 | 3.1 | 95.6 | 96.9 |
| Feed Calc. | 100.0 | 10.6 | | | | | | | | | | |
| 35 × 65 MESH Not Tabled | | | | | | | | | | | | |
| Cond. | 8.6 | 0.5 | | | | | | | | | | |
| Mag | 5.5 | 0.3 | | | | | | | | | | |
| Non Mag/Non Cond. | 85.9 | 4.8 | 3.18 | 3.09 | 6.27 | 100.0 | 100.0 | 100.0 | 9.2 | 3.5 | 90.8 | 96.5 |
| Feed Calc. | 100.0 | 5.6 | | | | | | | | | | |
| Rougher Lights | | | | | | | | | | | | |
| Cond. | 10.0 | 0.5 | | | | | | | | | | |
| Mag | 3.2 | 0.2 | | | | | | | | | | |
| Non Mag/Non Cond. | 86.8 | 4.7 | 0.45 | 2.44 | 2.89 | 13.8 | 77.0 | 44.9 | 5.3 | 2.6 | 94.7 | 97.4 |

TABLE 10.2-continued

Data from Electrostatic and Induced Roll Separation on Air Table Products
Feed Crushed to minus 6 mesh

| Product | Weight Percent | | >2.3 S.G., % | | | >2.3 S.G., Dist., % | | | Insoluble Assay, % of | | Soluble Assay, % of | |
|---|---|---|---|---|---|---|---|---|---|---|---|---|
| | Feed | Sample | Plus | Minus | Total | Plus | Minus | Size | Total | <2.3 SG | Total | <2.3 SG |
| Feed Calc. | 100.0 | 5.4 | | | | | | | | | | |
| Cleaner Lights | | | | | | | | | | | | |
| Cond. | 13.0 | 0.7 | | | | | | | | | | |
| Mag | 4.8 | 0.3 | | | | | | | | | | |
| Non Mag/Non Cond. | 82.2 | 4.4 | 0.24 | 1.73 | 1.97 | 6.8 | 50.7 | 28.5 | 4.9 | 2.8 | 95.1 | 97.2 |
| Feed Calc. | 100.0 | 5.3 | | | | | | | | | | |
| CUMULATIVE PRODUCTS | | | | | | | | | | | | |
| Total NM/NC from Untabled Feed | | 64.7 | | | | 100.0 | 100.0 | 100.0 | 4.6 | 2.6 | 95.4 | 97.4 |
| Total NM/NC from Rou. + Scav. | | 62.9 | | | | 36.9 | 99.1 | 76.2 | 4.0 | 2.6 | 96.0 | 97.4 |
| Lights | | 55.6 | | | | 20.7 | 78.1 | 57.0 | 3.7 | 2.6 | 96.3 | 97.4 |
| Total NM/NC from Rou. Lights | | 54.9 | | | | 11.3 | 58.9 | 41.4 | 3.5 | 2.5 | 96.5 | 97.5 |
| Total NM/NC from Cl. Lights | | | | | | | | | | | | |

NOTE:
The >2.3 sink products from the non mag., non cond. were screened at intermediate mesh sizes to determine the recoveries by particle size, i.e., the 6 × 10 m at 8 m, the 10 × 20 m at 14 m, the 20 × 35 m at 28 m, and the 35 × 65 m at 48 m.

EXAMPLE 11

This example illustrates beneficiation of trona using air tabling, electrostatic separation and magnetic separation, and demonstrates a relationship between breadth of size fractions and effectiveness of air tabling as the density separation method by comparison with heavy liquid separation.

A sample of bulk trona from Bed 17 of the Green River Formation in Wyoming was crushed to −10 mesh. The sample was subsequently sized into size fractions of 10×20 mesh, 20×35 mesh and 35×65 mesh (Tyler mesh). Each of the size fractions was then subjected to initial density separation on an air table (Rougher Pass). The size fractions were subsequently sent through a cleaner and for the 10×20 mesh fractions, a scavenger pass. The resulting separations are shown in Table 11.1.

Each of the size fractions was then subsequently beneficiated using electrostatic separation and magnetic separation. The portions of material from each separation reporting to various product streams are shown in Table 11.1.

The non-magnetic/non-conductive fractions were then further analyzed by conducting a second density separation based on heavy liquid separation to identify what portion of impurities which are separable by density separation had not been removed in the earlier air tabling step. The results of this analysis are shown in Table 11.2. The column entitled ">2.3 S.G., %" identifies the total amount of material separated from the beneficiated ore by the additional heavy liquid density separation step. Additionally, that column shows subcolumns titled "Plus" and "Minus." These two subcolumns represent a breakdown of the "Total" percentage of material which is greater than 2.3 S.G. which falls into either the coarser or finer portion of the particular stream. For example, the 10×20 mesh fraction was broken down into a 10×14 mesh fraction and an 14×20 mesh fraction. Thus, by comparing the "Plus" and "Minus" subcolumns of the ">2.3 S.G., %," it can be seen that inefficiency in the air tabling density separation tended to be at smaller particle sizes within each size fraction because most of the higher specific gravity material left by air tabling was in the smaller particle size (the "Minus" column).

The columns titled "Insoluble Assay" and "Soluble Assay" provide data on the portion of each stream which is insoluble (i.e., impurity) before heavy liquid separation ("Total" subcolumn) and after heavy liquid separation ("<2.3 S.G." subcolumn). Thus, for example, the purity of products resulting from beneficiating ore using air tabling can be seen in the "Total" subcolumn of the "Soluble Assay" column for each of the different streams. This purity can be compared with the subsequent column, having a higher purity, which identifies the purity of the beneficiated material with the subsequent heavy liquid separation to indicate a theoretical purity based on perfect density separation. In addition, the improvement in trona purity between the non-magnetic/non-conductive product which was not air tabled and the non-magnetic/non-conductive product which was air tabled can be seen by comparing the "Total Non-Magnetic/Non-Conductive from Untabled Feed" line with the "Total Non-Magnetic/Non-Conductive from Cleaner Lights" line in the "Cumulative Products" section of Table 11.2.

TABLE 11.1

Data from Air Table Tests on Bulk Trona Sample
Crushed to Minus 10 Mesh

| | Weight, % of | | |
|---|---|---|---|
| Product | Feed | Size Fraction | Sample |
| 10 × 20 MESH | | | |
| Rougher Pass | | | |
| Heavies | 13.6 | 13.6 | 4.1 |
| Lights | 86.4 | 86.4 | 26.3 |
| Feed Calc. | 100.0 | 100.0 | 30.4 |
| Scavenger Pass | | | |
| Heavies | 8.2 | 1.8 | 0.3 |
| Lights | 91.8 | 12.5 | 3.8 |
| Feed Calc. | 100.0 | 14.3 | 4.1 |
| Cleaner Pass | | | |
| Heavies | 3.0 | 2.6 | 0.8 |
| Lights | 97.0 | 83.8 | 25.5 |
| Feed Calc. | 100.0 | 86.4 | 26.3 |
| 20 × 35 MESH | | | |

TABLE 11.1-continued

Data from Air Table Tests on Bulk Trona Sample
Crushed to Minus 10 Mesh

| Product | Weight, % of | | |
|---|---|---|---|
| | Feed | Size Fraction | Sample |
| Rougher Pass | | | |
| Heavies | 1.3 | 1.3 | 0.3 |
| Lights | 98.7 | 98.7 | 20.1 |
| Feed Calc. | 100.0 | 100.0 | 20.4 |
| Cleaner Pass | | | |
| Heavies | 4.4 | 4.3 | 0.9 |
| Lights | 95.6 | 94.4 | 19.2 |
| Feed Calc. | 100.0 | 98.7 | 20.1 |
| 35 × 65 MESH | | | |
| Rougher Pass | | | |
| Heavies | 13.0 | 13.0 | 1.1 |
| Lights | 87.0 | 87.0 | 7.4 |
| Feed Calc. | 100.0 | 100.0 | 8.5 |
| Cleaner Pass | | | |
| Heavies | 18.0 | 15.7 | 1.3 |
| Lights | 82.0 | 71.3 | 6.1 |
| Feed Calc. | 100.0 | 87.0 | 7.4 |
| MINUS 65 MESH (not air tabled) | | | 40.7 |
| TOTAL FEED CALC. | | 100.0 | |

TABLE 11.2

Data from Electrostatic and Induced Roll Separations on Air Table Products
Feed Crushed to minus 10 mesh

| Product | Weight Percent | | >2.3 S.G., % | | | >2.3 S.G., Dist., % | | | Insoluble Assay, % of | | Soluble Assay, % of | |
|---|---|---|---|---|---|---|---|---|---|---|---|---|
| | Feed | Sample | Plus | Minus | Total | Plus | Minus | Size | Total | <12.3 SG | Total | <2.3 SG |
| 10 × 20 MESH | | | | | | | | | | | | |
| Not Tabled | | | | | | | | | | | | |
| Cond. | 24.7 | 7.5 | | | | | | | | | | |
| Mag | 1.6 | 0.5 | | | | | | | | | | |
| Non Mag/Non Cond. | 73.7 | 22.4 | 0.59 | 1.19 | 1.78 | 100.0 | 100.0 | 100.0 | 4.0 | 2.6 | 96.0 | 97.4 |
| Feed Calc. | 100.0 | 30.4 | | | | | | | | | | |
| Rougher Lights | | | | | | | | | | | | |
| Cond. | 16.6 | 4.4 | | | | | | | | | | |
| Mag | 3.6 | 0.9 | | | | | | | | | | |
| Non Mag/Non Cond. | 79.8 | 21.0 | 0.06 | 0.7 | 0.76 | 9.5 | 55.1 | 40.0 | 2.7 | 2.4 | 97.3 | 97.6 |
| Feed Calc. | 100.0 | 26.3 | | | | | | | | | | |
| Scavenger Lights | | | | | | | | | | | | |
| Cond. | 23.1 | 0.9 | | | | | | | | | | |
| Mag | 3.7 | 0.1 | | | | | | | | | | |
| Non Mag/Non Cond. | 73.1 | 2.8 | 0.51 | 3.05 | 3.56 | 10.7 | 31.8 | 24.8 | 6.5 | 2.3 | 93.5 | 97.7 |
| Feed Calc. | 100.0 | 3.8 | | | | | | | | | | |
| Cleaner Lights | | | | | | | | | | | | |
| Cond. | 23.1 | 5.9 | | | | | | | | | | |
| Mag | 3.7 | 1.0 | | | | | | | | | | |
| Non Mag/Non Cond. | 73.1 | 18.6 | 0.02 | 0.63 | 0.65 | 2.8 | 44.1 | 30.4 | 2.5 | 2.3 | 97.5 | 97.7 |
| Feed Calc. | 100.0 | 25.5 | | | | | | | | | | |
| 20 × 35 MESH | | | | | | | | | | | | |
| Not Tabled | | | | | | | | | | | | |
| Cond. | 4.2 | 0.9 | | | | | | | | | | |
| Mag | 9.7 | 2.0 | | | | | | | | | | |
| Non Mag/Non Cond. | 86.1 | 17.6 | 1.48 | 1.61 | 3.09 | 100.0 | 100.0 | 100.0 | 6.2 | 3.7 | 93.8 | 96.3 |
| Feed Calc. | 100.0 | 20.4 | | | | | | | | | | |
| Rougher Lights | | | | | | | | | | | | |
| Cond. | 4.8 | 1.0 | | | | | | | | | | |
| Mag | 10.1 | 2.0 | | | | | | | | | | |
| Non Mag/Non Cond. | 85.1 | 17.1 | 0.44 | 1.72 | 2.16 | 29.0 | 104.1 | 68.1 | 5.5 | 3.7 | 94.5 | 96.3 |
| Feed Calc. | 100.0 | 20.1 | | | | | | | | | | |
| Cleaner Lights | | | | | | | | | | | | |
| Cond. | 4.6 | 0.9 | | | | | | | | | | |
| Mag | 8.6 | 1.7 | | | | | | | | | | |
| Non Mag/Non Cond. | 86.8 | 16.7 | 0.23 | 1.29 | 1.52 | 14.7 | 76.0 | 46.7 | 4.7 | 3.9 | 95.3 | 96.1 |
| Feed Calc. | 100.0 | 19.2 | | | | | | | | | | |
| 35 × 65 MESH | | | | | | | | | | | | |

TABLE 11.2-continued

Data from Electrostatic and Induced Roll Separations on Air Table Products
Feed Crushed to minus 10 mesh

| Product | Weight Percent Feed | Weight Percent Sample | >2.3 S.G., % Plus | >2.3 S.G., % Minus | >2.3 S.G., % Total | >2.3 S.G., Dist., % Plus | >2.3 S.G., Dist., % Minus | >2.3 S.G., Dist., % Size | Insoluble Assay, % of Total | Insoluble Assay, % of <12.3 SG | Soluble Assay, % of Total | Soluble Assay, % of <2.3 SG |
|---|---|---|---|---|---|---|---|---|---|---|---|---|
| Not Tabled | | | | | | | | | | | | |
| Cond. | 10.8 | 0.9 | | | | | | | | | | |
| Mag | 6.6 | 0.6 | | | | | | | | | | |
| Non Mag/Non Cond. | 82.6 | 7.0 | 0.66 | 1.8 | 2.46 | 100.0 | 100.0 | 100.0 | 5.4 | 2.8 | 94.6 | 97.2 |
| Feed Calc. | 100.0 | 8.5 | | | | | | | | | | |
| Rougher Lights | | | | | | | | | | | | |
| Cond. | 12.5 | 0.9 | | | | | | | | | | |
| Mag | 5.8 | 0.4 | | | | | | | | | | |
| Non Mag/Non Cond. | 81.7 | 6.0 | 0.29 | 1.33 | 1.62 | 37.8 | 63.6 | 56.7 | 4.5 | 3.2 | 95.5 | 96.8 |
| Feed Calc. | 100.0 | 7.4 | | | | | | | | | | |
| Cleaner Lights | | | | | | | | | | | | |
| Cond. | 13.3 | 0.8 | | | | | | | | | | |
| Mag | 2.8 | 0.2 | | | | | | | | | | |
| Non Mag/Non Cond. | 83.9 | 5.1 | 0.16 | 1.56 | 1.72 | 17.7 | 63.2 | 51.0 | 4.1 | 2.5 | 95.9 | 97.5 |
| Feed Calc. | 100.0 | 6.1 | | | | | | | | | | |
| CUMULATIVE PRODUCTS | | | | | | | | | | | | |
| Total NM/NC from Untabled Feed | | 47.0 | | | | 100.0 | 100.0 | 100.0 | 5.0 | 3.0 | 95.0 | 97.0 |
| Total NM/NC from Rou. + Scav. Lights | | 46.9 | | | | 27.3 | 89.8 | 65.2 | 4.2 | 3.0 | 95.8 | 97.0 |
| Total NM/NC from Rou. Lights | | 44.1 | | | | 24.0 | 77.2 | 56.3 | 4.0 | 3.0 | 96.0 | 97.0 |
| Total NM/NC from Cl. Lights | | 40.4 | | | | 11.5 | 61.0 | 41.5 | 3.6 | 3.0 | 96.4 | 97.0 |

NOTE:
The >2.3 sink products from the non mag., non cond. were screened at intermediate mesh size to determine the recoveries by particle size, i.e., the 10 × 20 m at 14 m, the 20 × 35 m at 28 m, and the 35 × 65 m at 48 m.

What is claimed is:

1. A process for recovering trona from an ore containing trona and impurities, comprising the steps of:
   (a) reducing a particle size of said ore to less than about 6 mesh;
   (b) sizing the ore into size fractions, wherein ore having a particle size between about 6 mesh and about 100 mesh is sized into at least three size fractions;
   (c) separating a first portion of impurities comprising shortite from each of said fractions by subjecting each fraction to a density separation method selected from the group consisting of air tabling and dry jigging to produce recovered trona;
   (d) electrostatically separating a second portion of impurities from each of said fractions to produce recovered trona; and
   (e) magnetically separating a third portion of impurities from each of said fractions to produce recovered trona.

2. A process, as claimed in claim 1, wherein said density separation comprises air tabling.

3. A process, as claimed in claim 1, wherein said first portion of impurities is more dense than said trona.

4. A process, as claimed in claim 1, wherein said second portion of impurities is more electrically conductive than said trona.

5. A process, as claimed in claim 1, wherein said third portion of impurities is more magnetic than said trona.

6. A process, as claimed in claim 1, wherein the purity of said recovered trona is at least about 85% after all of said steps.

7. A process, as claimed in claim 1, further comprising, before steps (d) and (e), the step of de-dusting said ore to recover fines.

8. A process, as claimed in claim 1, further comprising, before step (c), the step of sizing the ore into between three and ten size fractions before said separating steps.

9. A process, as claimed in claim 1, further comprising, before step (c), the step of drying the ore to remove surface moisture therefrom.

10. A process, as claimed in claim 1, further comprising the steps of:
   scavenging a recovered portion from one or more of said first, second and third portions of impurities; and
   recycling said recovered portion back to said process.

11. A process, as claimed in claim 1, further comprising an additional separating step on said fractions selected from the group consisting of density separation, electrostatic separation and magnetic separation to further remove impurities therefrom.

12. A process, as claimed in claim 1, wherein a weight recovery of said trona resulting from said density separation step is between about 65% and about 95%.

13. A process, as claimed in claim 1, wherein the purity of said recovered trona is at least about 85% after all of said steps.

14. A process, as claimed in claim 13, wherein the purity of said recovered trona is at least about 97% after all of said steps.

15. A process, as claimed in claim 1, further comprising the steps of:
   scavenging a recovered portion from said first portion of impurities; and recycling said recovered portion back to said process.

16. A process for recovering trona from an ore containing trona and impurities, comprising the steps of:
   (a) reducing a particle size of the ore to less than about 6 mesh;
   (b) sizing the ore into size fractions, wherein ore having a particle size between 6 mesh and 100 mesh is sized into between three and ten size fractions;
   (c) separating a first portion of impurities comprising shortite from each of said fractions by subjecting each fraction to a density separation method selected from the group consisting of air tabling and dry jigging; and
   (d) recovering trona.

17. A process, as claimed in claim 16, further comprising:
   (e) electrostatically separating a second portion of impurities from each of said fractions, said second portion being more electrically conductive than trona.

18. A process, as claimed in claim 16, further comprising:
   (e) magnetically separating a second portion of impurities from each of said fractions, said second portion being more magnetic than trona.

19. A process, as claimed in claim 16, wherein the purity of said trona is at least about 85% after said separating step.

20. A process, as claimed in claim 19, wherein the purity of said trona is at least about 97% after said separating step.

21. A process, as claimed in claim 17, further comprising, before step (e), the step of de-dusting each of said fractions to recover fines and wherein said fines have a purity of greater than about 94%.

22. A process, as claimed in claim 16, further comprising, before step (c), the step of:
   drying each of said fractions to remove moisture therefrom.

* * * * *

UNITED STATES PATENT AND TRADEMARK OFFICE
CERTIFICATE OF CORRECTION

PATENT NO. : 5,470,554
DATED : November 28, 1995
INVENTOR(S) : Schmidt, et. al.

It is certified that error appears in the above-indentified patent and that said Letters Patent is hereby corrected as shown below:

Title page, item [54] and col. 1, line 1, delete "BENEFICATION" and insert therefor --BENEFICIATION--.

Columns 31-32, Table 11.2, line 25, please delete "<12.3 SG" and insert therefor --<2.3 SG--.

Columns 33-34, Table 11.2 - continued, line 5, please delete "<12.3 SG" and insert therefor --<2.3 SG--.

Signed and Sealed this

Seventh Day of May, 1996

Attest:

BRUCE LEHMAN

*Attesting Officer*   Commissioner of Patents and Trademarks